(12) United States Patent
Chandrasekar et al.

(10) Patent No.: US 10,586,005 B1
(45) Date of Patent: Mar. 10, 2020

(54) INCREMENTAL SYNTHESIS FOR CHANGES TO A CIRCUIT DESIGN

(71) Applicant: Xilinx, Inc., San Jose, CA (US)

(72) Inventors: Kameshwar Chandrasekar, Hyderabad (IN); Surya Pratik Saha, Hyderabad (IN); Aman Gayasen, Hyderabad (IN); Sumanta Datta, Hyderabad (IN)

(73) Assignee: XILINX, INC., San Jose, CA (US)

( * ) Notice: Subject to any disclaimer, the term of this patent is extended or adjusted under 35 U.S.C. 154(b) by 37 days.

(21) Appl. No.: 15/927,846

(22) Filed: Mar. 21, 2018

(51) Int. Cl.
   *G06F 17/50* (2006.01)
(52) U.S. Cl.
   CPC ........ *G06F 17/505* (2013.01); *G06F 2217/02* (2013.01); *G06F 2217/06* (2013.01)
(58) Field of Classification Search
   CPC .................................................. G06F 17/505
   USPC .......................................................... 716/105
   See application file for complete search history.

(56) References Cited

U.S. PATENT DOCUMENTS

| | | | |
|---|---|---|---|
| 5,867,396 A | | 2/1999 | Parlour |
| 6,026,226 A | * | 2/2000 | Heile ................. G01R 31/3177 716/103 |
| 6,080,204 A | * | 6/2000 | Mendel ............... G06F 17/5054 716/103 |
| 6,311,317 B1 | | 10/2001 | Khoche et al. |
| 6,345,378 B1 | * | 2/2002 | Joly .................... G06F 17/5045 716/104 |
| 7,178,118 B2 | | 2/2007 | Ramachandran et al. |
| 7,206,967 B1 | | 4/2007 | Marti et al. |
| 7,669,157 B1 | * | 2/2010 | Borer ................... G06F 17/505 703/22 |
| 8,151,228 B2 | | 4/2012 | Ramachandran et al. |
| 8,281,274 B1 | * | 10/2012 | Padalia ............... G06F 17/5022 716/132 |
| 8,296,695 B1 | | 10/2012 | Chen et al. |
| 8,352,526 B1 | | 1/2013 | Alfke |

(Continued)

OTHER PUBLICATIONS

Synopsys, "Synplify Pro and Premier," Synopsys Datasheet, copyright 2015, pp. 1-3, Synopsys, Inc., Mountain View, California, USA.

(Continued)

*Primary Examiner* — Suresh Memula
(74) *Attorney, Agent, or Firm* — Kevin T. Cuenot

(57) ABSTRACT

Incremental synthesis for changes to a circuit design can include synthesizing, using computer hardware, a first circuit design resulting in a partitioning of the first circuit design and a plurality of synthesized partitions of the first circuit design and, for a second circuit design that is a modified version of the first circuit design and based upon the partitioning of the first circuit design, determining, using the computer hardware, a partition of the second circuit design that differs from the first circuit design. The partition of the second circuit design can be technology mapped using the computer hardware resulting in a synthesized partition of the second circuit design. A synthesized circuit design corresponding to the second circuit design can be generated using the computer hardware by combining synthesized partitions of the plurality of synthesized partitions of the first circuit design that are unchanged relative to the second circuit design with the synthesized partition of the second circuit design.

20 Claims, 6 Drawing Sheets

(56) References Cited

U.S. PATENT DOCUMENTS

| | | | |
|---|---|---|---|
| 8,484,596 B1 | 7/2013 | Chen et al. | |
| 8,595,674 B2 | 11/2013 | McElvain et al. | |
| 8,732,634 B1 | 5/2014 | Chen et al. | |
| 8,769,450 B1 | 7/2014 | Tian et al. | |
| 8,819,608 B2 | 8/2014 | McElvain et al. | |
| 8,832,618 B1 * | 9/2014 | Brissenden | G06F 17/5045 |
| | | | 716/110 |
| 8,990,743 B2 | 3/2015 | Ramachandran et al. | |
| 9,147,023 B1 | 9/2015 | Chen et al. | |
| 9,230,047 B1 * | 1/2016 | Van Antwerpen | G06F 17/504 |
| 9,569,574 B1 | 2/2017 | Khan et al. | |
| 2010/0218146 A1 * | 8/2010 | Platzker | G06F 17/505 |
| | | | 716/103 |
| 2017/0103156 A1 * | 4/2017 | Gupta | G06F 17/5054 |

OTHER PUBLICATIONS

Passignolo, Rafael Trapani et al., "Live-Synth: Towards an Interactive Synthesis Flow," Design Automation Conference (DAC), Jun. 19, 2017, pp. 1-6, IEEE, Piscataway, New Jersey, USA.

Chen, Doris et al., "Line-Level Incremental reSynthesis Techniques for FPGAs," Proc. of the 19th ACM/SIGDA International Symposium on Field Programmable Gate Arrays, Feb. 27, 2011, p. 133-142, ACM, New York, New York, USA.

Xilinx, "Vivado Design Suite User Guide—Hierarchical Design," UG905 (v2017.2), Jun. 7, 2017, pp. 1-24, Xilinx, Inc., San Jose, California, USA.

Specification and drawings for U.S. Appl. No. 15/429,014, filed Feb. 9, 2017, Gayasen et al.

* cited by examiner

INCREMENTAL SYNTHESIS FOR CHANGES TO A CIRCUIT DESIGN

TECHNICAL FIELD

This disclosure relates to integrated circuits (ICs) and, more particularly, to performing incremental synthesis on circuit designs that include changes.

BACKGROUND

Implementing a circuit design within an integrated circuit (IC) entails processing the circuit design through a design flow. The design flow includes multiple, different phases. These phases generally include synthesis, placement, and routing. In general, synthesis refers to the process of generating a gate-level netlist from a high-level description of a circuit or system. Placement refers to the process of assigning elements of the synthesized circuit design to particular instances of circuit blocks and/or resources having specific locations on the target IC. Routing refers to the process of selecting or implementing particular routing resources, e.g., wires and/or other interconnect circuitry, to electrically couple the various circuit blocks of the target IC after placement.

Throughout the design cycle, designers make incremental changes to the circuit design. After each such change, the circuit design may be re-processed through one or more or all of the phases of the design flow to determine the effects of the change on the performance of the circuit design. For example, synthesis is performed to obtain a synthesized version of the modified circuit design. The synthesized circuit design may then be placed and/or routed. Despite the prior version of the circuit design having been synthesized, available electronic design automation tools typically expend significant amounts of runtime synthesizing the modified version of the circuit design. Further, the results obtained are often unpredictable relative to prior synthesis results.

SUMMARY

In one or more embodiments, a method can include synthesizing, using computer hardware, a first circuit design resulting in a partitioning of the first circuit design and a plurality of synthesized partitions of the first circuit design, for a second circuit design that is a modified version of the first circuit design and based upon the partitioning of the first circuit design, determining, using the computer hardware, a partition of the second circuit design that differs from the first circuit design, and technology mapping, using the computer hardware, the partition of the second circuit design resulting in a synthesized partition of the second circuit design. The method can include generating, using the computer hardware, a synthesized circuit design corresponding to the second circuit design by combining synthesized partitions of the plurality of synthesized partitions of the first circuit design that are unchanged relative to the second circuit design with the synthesized partition of the second circuit design.

In one or more embodiments, a system includes a memory configured to store program code and a processor coupled to the memory. The processor, in response to executing the program code, is configured to initiate operations. The operations can include synthesizing a first circuit design resulting in a partitioning of the first circuit design and a plurality of synthesized partitions of the first circuit design, for a second circuit design that is a modified version of the first circuit design and based upon the partitioning of the first circuit design, determining a partition of the second circuit design that differs from the first circuit design, and technology mapping the partition of the second circuit design resulting in a synthesized partition of the second circuit design. The operations can include generating a synthesized circuit design corresponding to the second circuit design by combining synthesized partitions of the plurality of synthesized partitions of the first circuit design that are unchanged relative to the second circuit design with the synthesized partition of the second circuit design.

In one or more embodiments, a computer program product includes a computer readable storage medium having program code stored thereon. The program code is executable by a processor to perform operations. The operations can include synthesizing a first circuit design resulting in a partitioning of the first circuit design and a plurality of synthesized partitions of the first circuit design, for a second circuit design that is a modified version of the first circuit design and based upon the partitioning of the first circuit design, determining a partition of the second circuit design that differs from the first circuit design, and technology mapping the partition of the second circuit design resulting in a synthesized partition of the second circuit design. The operations can include generating a synthesized circuit design corresponding to the second circuit design by combining synthesized partitions of the plurality of synthesized partitions of the first circuit design that are unchanged relative to the second circuit design with the synthesized partition of the second circuit design.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
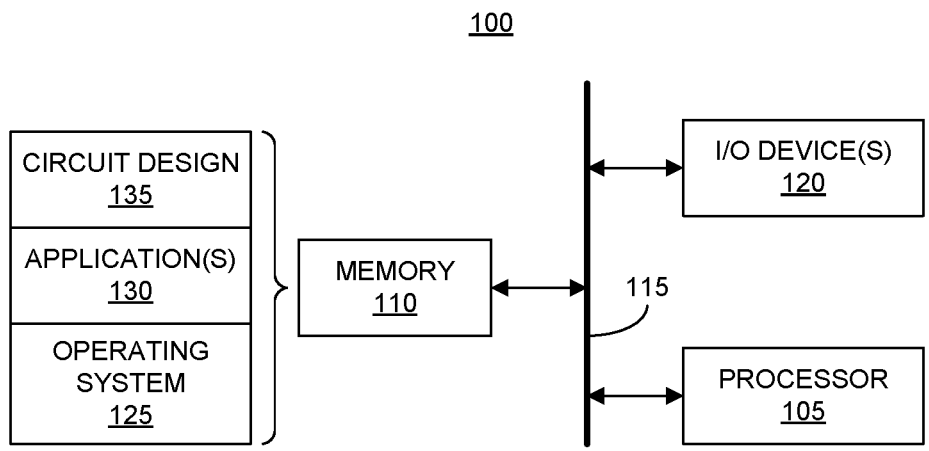
FIG. 1 illustrates an example of a system for use with one or more embodiments described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to performing incremental synthesis on circuit designs that include changes. In one or more embodiments, a system is capable of performing a first synthesis process on a circuit design. The system is capable of generating various assets that may be used in a subsequent synthesis process performed on a modified version of the circuit design. Examples of the assets generated by the system may include, but are not limited to, a partitioning the circuit design and synthesized partitions of the circuit design. Other assets may also be generated during the first synthesis process and, as such, re-used in a subsequent synthesis process.

Subsequent to a change to the circuit design resulting in a modified version of the circuit design (e.g., the "modified circuit design"), the system is capable of performing a second synthesis process on the modified circuit design to generate a synthesized version of the modified circuit design. During the second synthesis process, the system is capable of utilizing certain ones of the assets generated during the first synthesis process. By using assets generated from a prior synthesis process, the system is capable of generating a synthesized version of the modified circuit design in less time than would otherwise be the case.

In one or more embodiments, the second synthesis process utilizes the partitioning determined during the first synthesis process. The second synthesis process is also capable of determining which portions of the modified circuit design have changed and synthesizing the changed portions. For example, the system may use a map of modules of the circuit design to partitions generated during the first synthesis process in order to ascertain the particular partition(s) of the modified circuit design that have changed and require synthesis.

The system is capable of performing the second synthesis process to generate the synthesized version of the modified circuit design by combining synthesized partitions from the first synthesis process with synthesized partition(s) generated by the second synthesis process. For example, the system is capable of selecting those synthesized partitions from the first synthesis process corresponding to partitions that have not changed. The system combines the synthesized partitions corresponding to unchanged partitions from the first synthesis process with the synthesized partitions generated during the second synthesis process that correspond to partitions that did change.

In some conventional systems, the entire modified circuit design is re-synthesized after any incremental change. Re-synthesizing the entire modified circuit design requires a significant amount of processing time. Often, when re-synthesizing the entire modified circuit design, the predictability of the Quality of Result (QOR) obtained varies dramatically since synthesis processes can be sensitive to even small changes in the circuit design. For example, the changes introduced in the modified circuit design may have repercussions to partitions of the modified circuit design that were unchanged from the original version of the circuit design.

In other conventional systems, the portions of the modified circuit design that changed are re-synthesized. In such cases, the user is required to perform a manual partitioning of the (modified) circuit design. Further, the user must specify any partition-specific design constraints separately. The user defined partitions are restricted to occur at module boundaries of the circuit design. These boundaries are hardened to avoid cross-partition optimizations. Manually specifying design constraints and mapping the design constraints to the user specified partitions is time intensive and tedious.

Further, in conventional systems where changed portions of the modified circuit design are re-synthesized, such systems often rely on tracking the nets that changed from the original circuit design to the modified circuit design during synthesis. In the modified circuit design, the changed portions (e.g., changed nets) are merged with the unchanged nets before any synthesis optimizations are applied. The system must track and identify unchanged nets (or portions thereof) as close to the point of change in the net(s) as possible for purposes of merging for faster synthesis of the modified circuit design. This technique, however, necessarily incurs significant computational overhead to track the nets of the original and modified circuit designs as described, which may slow the process.

Accordingly, the embodiments described within this disclosure are capable of synthesizing a modified circuit design in a more computationally efficient manner compared to conventional systems. A system configured to perform the operations described herein, for example, is capable of synthesizing the modified circuit design in significantly less time than other conventional systems. Further, the synthesized version of the modified circuit design has a predictable QOR relative to the synthesized version of the original circuit design (e.g., the circuit design prior to the change). In addition, by using the partitioning determined during the first synthesis process for the second synthesis process for the modified circuit design, the second synthesis process is not subject to constraints relating to manual partitioning, location of partitions, and/or manual generation of partition-specific constraints.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a system 100 for use with one or more embodiments described within this disclosure. System 100 is an example of computer hardware that may be used to implement a computer, a server, a portable computer such as a laptop or a tablet computer, or other data processing system. A system or device implemented using computer hardware is capable of performing the various operations described within this disclosure relating to processing a circuit design and/or implementing the circuit design within an IC.

In the example of FIG. 1, system 100 includes at least one processor 105. Processor 105 is coupled to memory 110 through interface circuitry 115. System 100 is capable of storing computer readable instructions (also referred to as "program code") within memory 110. Memory 110 is an example of computer readable storage media. Processor 105 is capable of executing the program code accessed from memory 110 via interface circuitry 115.

Memory 110 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code in order to reduce the number of times program code must be retrieved from a bulk storage device during execution.

Memory 110 is capable of storing program code and/or data. For example, memory 110 is capable of storing various routines, programs, objects, components, logic, other suitable instructions, and/or other data structures. For purposes of illustration, memory 110 stores an operating system 125, one or more application(s) 130, and a circuit design 135. In one or more embodiments, application(s) 130 include an electronic design automation (EDA) application. The EDA application is capable of performing one or more operations of a design flow (e.g., synthesis, placement, routing, and/or bitstream generation) and/or the various operations described herein to implement circuit design 135 within a target IC.

System 100, e.g., processor 105, is capable of executing operating system 125 and application(s) 130 to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of system 100.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 100 further may include one or more I/O devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

System 100 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 100 may be used to implement a single computer or a plurality of networked or interconnected computers each implemented using the architecture of FIG. 1 or an architecture similar thereto.

Figure 2:
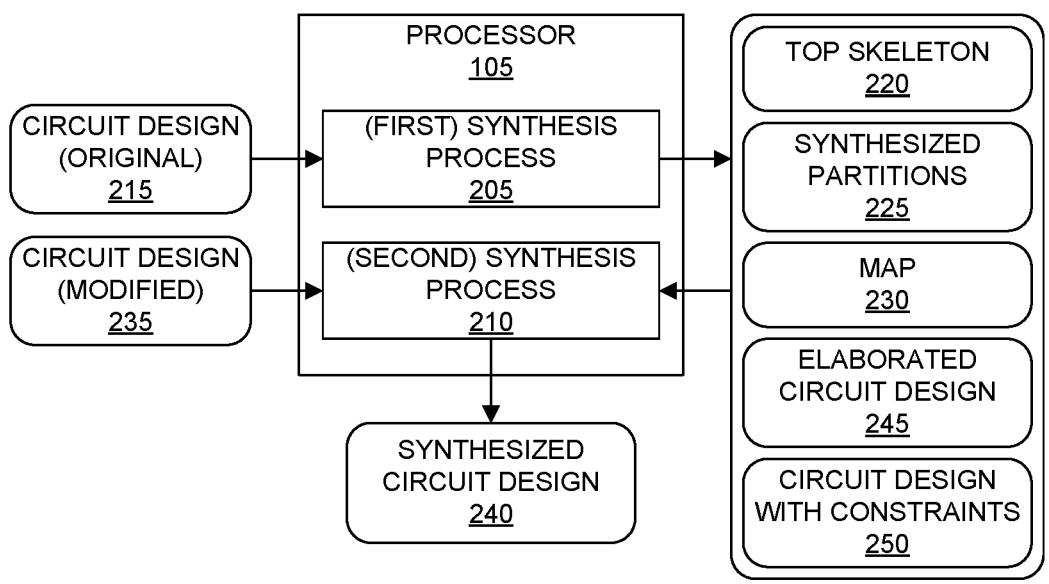
FIG. 2 illustrates example operations performed by a system to synthesize a circuit design and a modified version of the circuit design.

FIG. 2 illustrates an example of operations performed by system 100 to synthesize a circuit design and a modified version of the circuit design ("modified circuit design). FIG. 2 generally illustrates the operations performed and the results generated while processing the circuit design and the modified circuit design.

In the example of FIG. 2, processor 105 is capable of performing synthesis process 205 and synthesis process 210. Within this specification, synthesis process 205 may be referred to as the "first synthesis process" from time-to-time. Within this specification, synthesis process 210 may be referred to as the "second synthesis process" from time-to-time.

As part of performing synthesis process 205, processor 105 operates on circuit design 215. Within this specification, circuit design 215 may be referred to as the "original circuit design" from time-to-time. The "original circuit design" refers to a circuit design prior to introducing a change thereto. Circuit design 215 may be specified as a register transfer level (RTL) description. For example, circuit design 215 may be specified using a hardware description language (HDL). In performing synthesis process 205, processor 105 is capable of generating a top skeleton 220, synthesized partitions 225, 230, elaborated circuit design 245, and a circuit design with constraints (constraints circuit design) 250.

Synthesized partitions 225 are the individual, synthesized partitions from circuit design 215. Each partition of circuit design 215, for example, is represented independently, e.g., as an individual unit or file, as one of synthesized partitions 225. Top skeleton 220 is a data structure, e.g., a file, that specifies the hierarchy of modules and partitions forming circuit design 215. While top skeleton 220 specifies the hierarchy of the circuit design, the partitions and modules are empty, e.g., have no content. In this sense, top skeleton 220 is a "black-boxing" of circuit design 215 where modules and/or partitions are effectively empty containers that have input(s) and/or output(s). For example, the content of the partitions is extracted out as synthesized partitions 225. Map 230 specifies a mapping or association of modules to partitions for circuit design 215. The partitions for circuit design 215 may be determined automatically by system 100.

Synthesis process 205 is also capable of generating an elaborated version of circuit design 215 that may be output and stored. The elaborated version of circuit design 215 is illustrated as elaborated circuit design 245. Elaborated circuit design 245 may be partitioned. Synthesis process 205 is also capable of generating constraints circuit design 250. Constraints circuit design 250 may be partitioned and optimized with respect to area and/or timing. As such, constraints circuit design 250 specifies the partitioning of the circuit design with constraints applied to the boundaries of such partitions.

In one or more other embodiments, synthesis process 205 is also capable of generating a synthesized version of circuit design 215 that may be output and stored (not shown). The synthesized version of circuit design 215 may be partitioned (e.g., have a same partitioning as constraints circuit design 250).

In the example of FIG. 2, circuit design 235 is a modified version of circuit design 215. For example, circuit design 235 is a version of circuit design 215 after the introduction of a change. Within this specification, circuit design 235 may be referred to as the "modified circuit design" from time-to-time. Circuit design 235 may also be specified using RTL.

In particular embodiments, circuit design 235 may be incrementally changed compared to circuit design 215. As part of performing synthesis process 210, processor 105 operates on circuit design 235 and, in doing so, utilizes synthesized partitions 225, top skeleton 220, map 230, elaborated circuit design 245, and/or constraints circuit design 250 to generate synthesized circuit design 240 (e.g., the synthesized version of circuit design 235). By using, or re-using, assets such as selected ones of synthesized partitions 225, top skeleton 220, map 230, elaborated circuit design 245, and/or constraints circuit design 250, system 100 is capable of generating synthesized circuit design 240 in less time than other conventional systems.

Figure 3A:
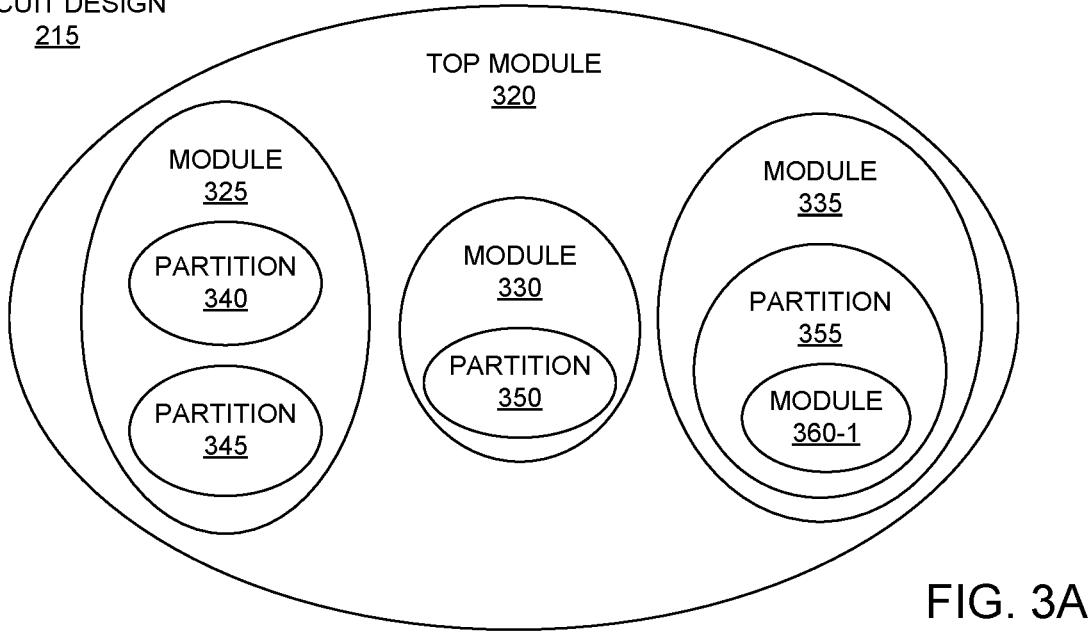
FIGS. 3A and 3B illustrate a circuit design and a modified version of the circuit design, respectively.
Figure 3B:
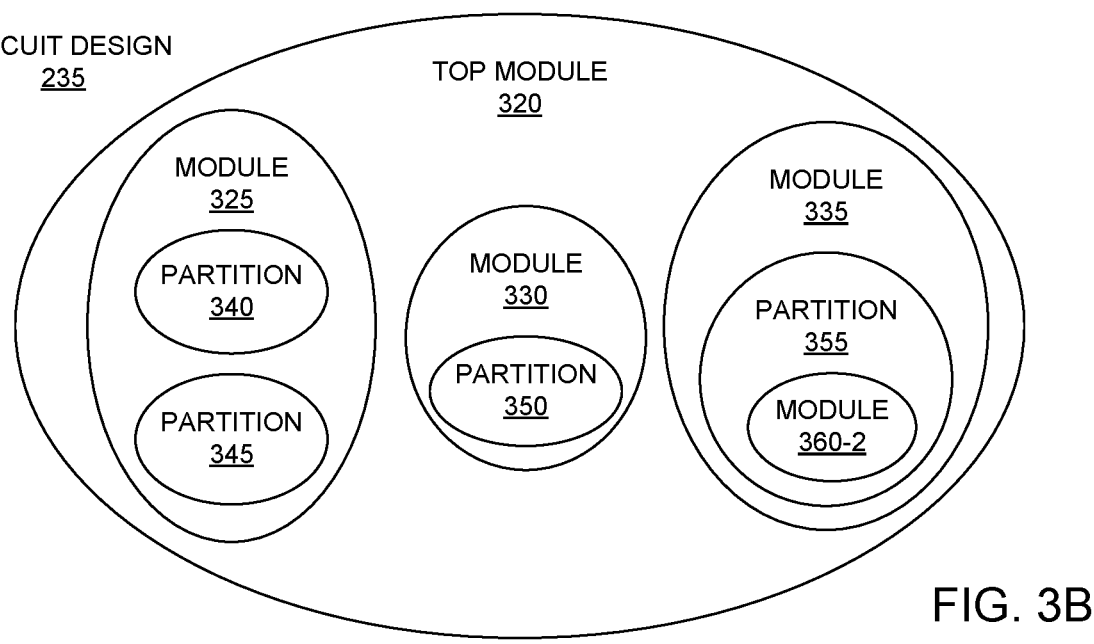

FIGS. 3A and 3B illustrate an example of circuit design 215 and modified circuit design 235, respectively. In the example of FIG. 3A, circuit design 215 includes a top module 320. Top module 320 contains modules 325, 330, and 335. Module 325 includes partitions 340 and 345. Module 330 includes partition 350. Module 335 includes partition 355. Partition 355 contains module 360-1. As illustrated by partitions 340 and 345 within module 325, partitions are not restricted to module boundaries.

In the example of FIG. 3B, circuit design 235 is substantially similar to circuit design 215. Circuit design 235 may not be partitioned. The system, for example, may impose the same partitioning determined for circuit design 215 during the first synthesis process on circuit design 235. As noted, the partitioning is not restricted to module boundaries (e.g., where module 325 includes partitions 340 and 345).

In circuit design 235, module 360-1, e.g., the RTL of module 360-1, has been changed and is illustrated as module 360-2. For example, module 360-2 may specify additional circuitry, modified circuitry, or less circuitry than module 360-1. Circuit design 235 is a candidate for processing through the second synthesis process illustrated in FIG. 2, which utilizes, or re-uses, assets generated from the first synthesis process performed on circuit design 215.

Figure 4:
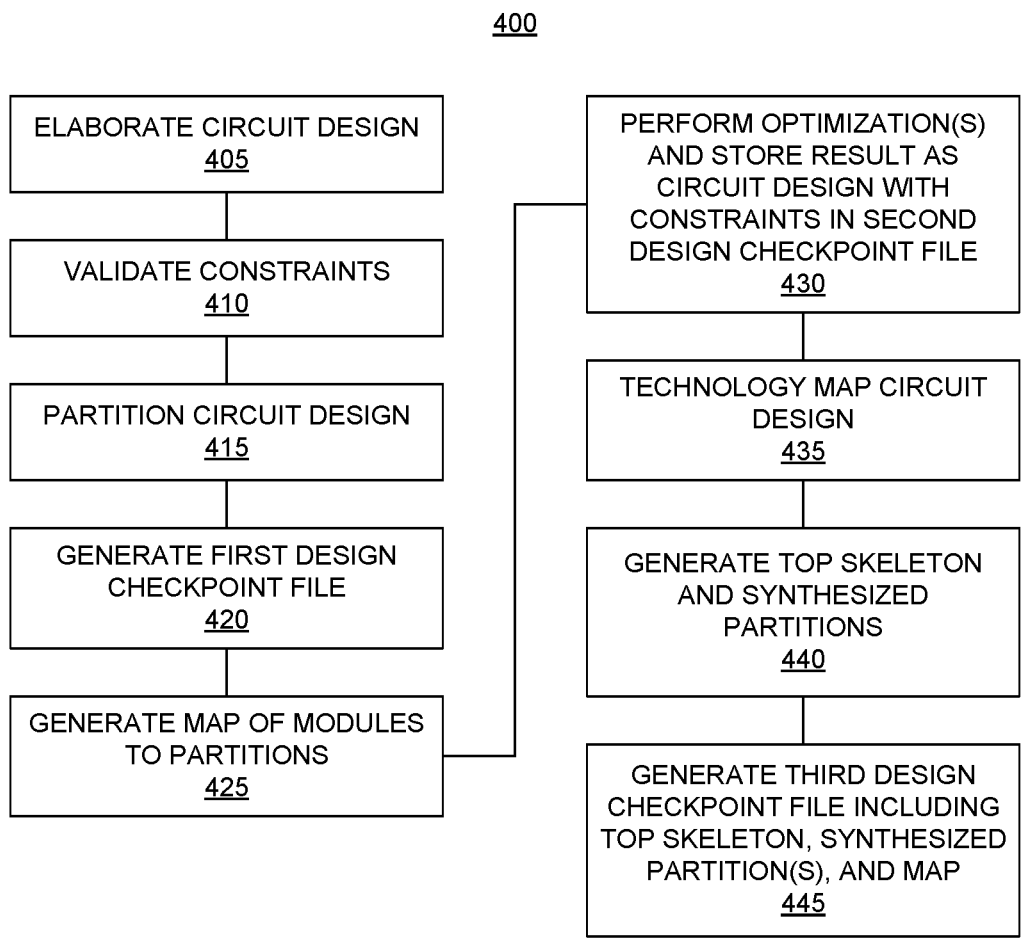
FIG. 4 illustrates an example method of synthesizing a circuit design.

FIG. 4 illustrates an example method 400 of synthesizing a circuit design. Method 400 may be performed by a system such as the system described in connection with FIG. 1. Method 400 illustrates an example implementation of synthesis process 205 (e.g., the first synthesis process) performed on circuit design 215.

In block 405, the system is capable of elaborating the circuit design. The circuit design may be specified in RTL. For example, the system is capable of the expanding and linking the separately analyzed units of the circuit design and/or recognizing portions of the RTL as generic technology cells. In block 410, the system is capable of validating the constraints specified for the RTL version of the circuit design against the elaborated version of the circuit design.

In block 415, the system is capable of partitioning the circuit design. In general, partitioning refers to the process of separating the elaborated circuit design into smaller blocks. In one or more embodiments, the system automatically partitions the circuit design. The system is capable of generating partitions for the circuit design at module boundaries and/or at intermediate boundaries (e.g., at locations within the elaborated circuit design other than module boundaries).

In block 420, the system generates a first design checkpoint file. In block 420, the system is capable of outputting the elaborated version of the circuit design as a design checkpoint file that may be stored in memory for subsequent use. As discussed in connection with block 415, the elaborated circuit design is partitioned. Accordingly, the first design checkpoint file includes a partitioned, elaborated version of the circuit design. In particular embodiments, the validated constraints may be stored within the design checkpoint file with the elaborated version of the circuit design.

In block 425, the system generates a map, e.g., a file, of modules of the circuit design to partitions of the circuit design. The map specifies the particular modules of the circuit design to which the different partitions created in block 420 belong. To the extent that hierarchies of module-partition-module exist, the map may specify such relationships.

In block 430, the system optionally performs one or more optimizations on the circuit design. For example, the system is capable of performing one or more area optimizations and/or one or more timing optimizations on the elaborated circuit design. In performing the optimization(s) described, timing constraints for the circuit design are propagated to the partition boundaries of the partitions in the circuit design. For example, delays for signals may be propagated to the pins at the boundaries of the partitions and stored in association with the pins for each respective partition. The result from block 430 may be stored as constraints circuit design 250. Constraints circuit design 250 may be stored in a second design checkpoint file and/or added to an existing design checkpoint file. The second design checkpoint file may also be stored in memory for subsequent use.

In block 435, the system is capable of technology mapping the circuit design to generate the synthesized circuit design. For example, the system is capable of determining the particular gate level components that correspond to the generic technology cells of the elaborated circuit design. The system is capable of generating the synthesized circuit design, which is a version of the circuit design specified using the gate level components. In particular embodiments, the gate level components may be primitives available in the target IC that will be used to implement the circuit design.

In block 440, the system is capable of generating a top skeleton for the circuit design and generating synthesized partitions for the circuit design. For example, the system is capable of extracting the synthesized partitions from the synthesized circuit design. By extracting the synthesized partitions from the synthesized circuit design, the system effectively "black boxes" the partitions within the synthesized circuit design resulting in the top skeleton.

In block 445, the system is capable of generating a third design checkpoint file. The third design checkpoint file generated in block 445 may include the top skeleton, the synthesized partitions of the circuit design, and the map generated in block 425. The third design checkpoint file may also be stored in memory for subsequent use. For example, the system is capable of using asset(s) stored in the first, second, and/or third design checkpoint file to perform subsequent synthesis operations on the modified circuit design.

In one or more embodiments, cross-partition optimizations may be disabled during and immediately after method 400. Thus, during block 430, for example, optimizations may be performed only within the respective partitions. Cross-partition optimizations may be enabled once synthesis is complete, e.g., following the second synthesis process performed on the modified circuit design. By disabling cross-partition optimizations during synthesis, the partition boundaries are preserved intact thereby allowing re-use of the partitions during the second synthesis process.

Figure 5:
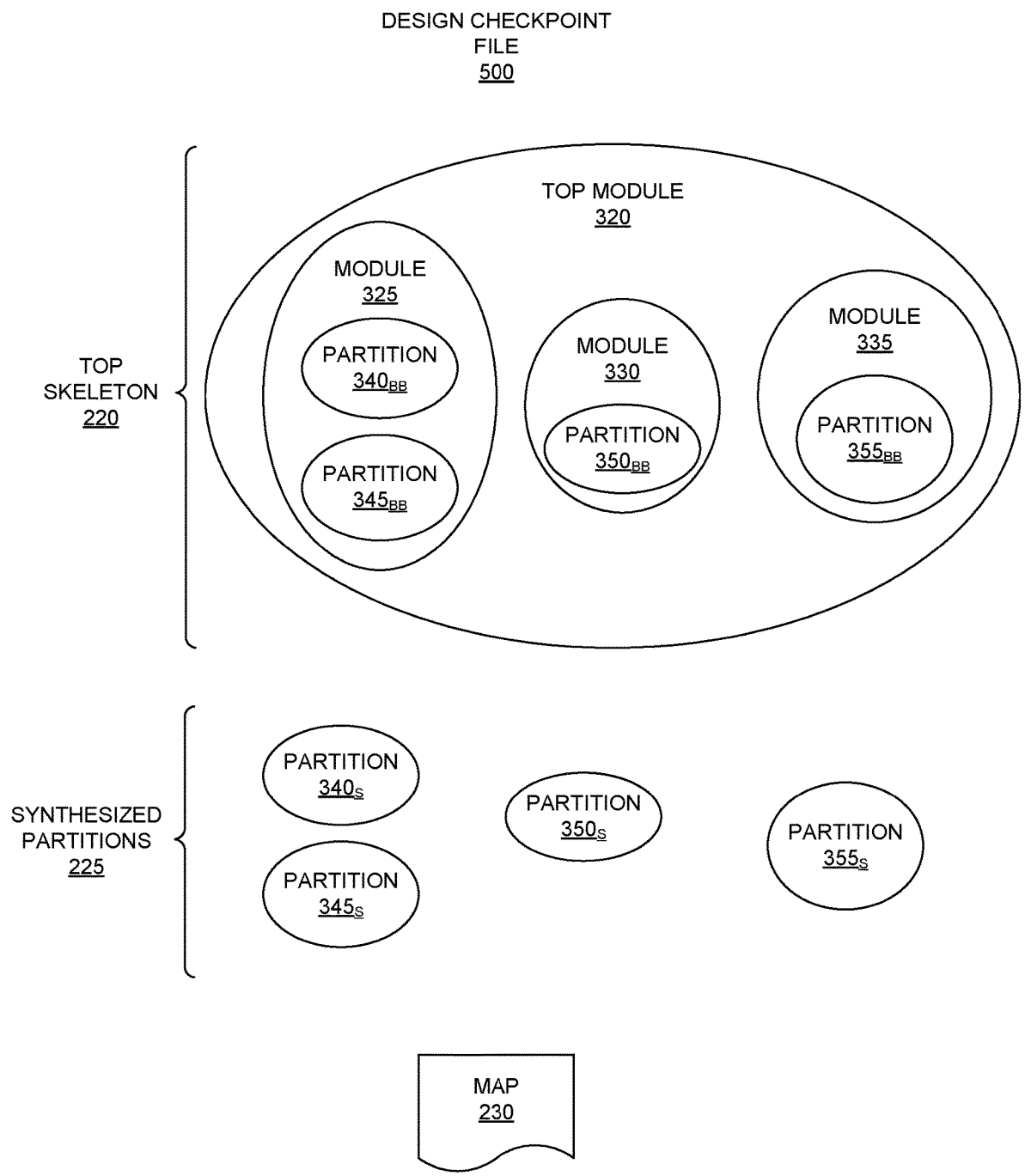
FIG. 5 illustrates an example of a design checkpoint file including assets that may be used to synthesize a modified version of a circuit design.

FIG. 5 illustrates an example of a design checkpoint file 500 including assets that may be used to perform incremental synthesis of a modified circuit design. Within this specification, the second synthesis process may be referred as "incremental synthesis" from time-to-time. Design checkpoint file 500 is an example implementation of the third design checkpoint file described in connection with FIG. 4. In particular embodiments, each design checkpoint file may be implemented as a container that may store one or more other files therein, e.g., a package file.

In the example of FIG. 5, design checkpoint file 500 includes top skeleton 220, one or more synthesized partitions 225, and map 230. Top skeleton 220 specifies the hierarchy of circuit design 215. As pictured, top skeleton 220 includes top module 320. Top module 320 contains modules 325, 330, and 335. In the example of FIG. 5, "black-boxed" partitions and are illustrated using the subscript "BB". As such, module 325 includes (black boxed) partitions $340_{BB}$ and $345_{BB}$. Module 330 includes partition $350_{BB}$. Module 335 includes partition $355_{BB}$. Partitions $340_{BB}$, $345_{BB}$, $350_{BB}$, and $355_{BB}$ are empty partitions within top skeleton 220. As discussed, while a top skeleton specifies hierarchy of a circuit design, the top skeleton does not include content. In this regard, partitions $340_{BB}$ through $355_{BB}$ are empty.

In the example of FIG. 5, "synthesized" versions of partitions are illustrated using the subscript "S". The synthesized versions of partitions 340, 345, 350, and 355 are shown as partitions 340s, 345s, 350s, and 355s. Partitions 340s, 345s, 350s, and 355s of circuit design 215 may be stored as individual files or as another data structure such as a single file with each individual synthesized partition demarcated within the file.

Map 230 specifies a mapping of modules and partitions. Referring to top skeleton 220, for example, map 230 specifies that partitions 340 and 345 are contained within module 325. Map 230 specifies that partition 350 is contained within module 330. Map 230 specifies that partition 355 is contained within module 335. Map 230 also specifies that modules 325, 330, and 335 are contained within top module 320.

Figure 6:
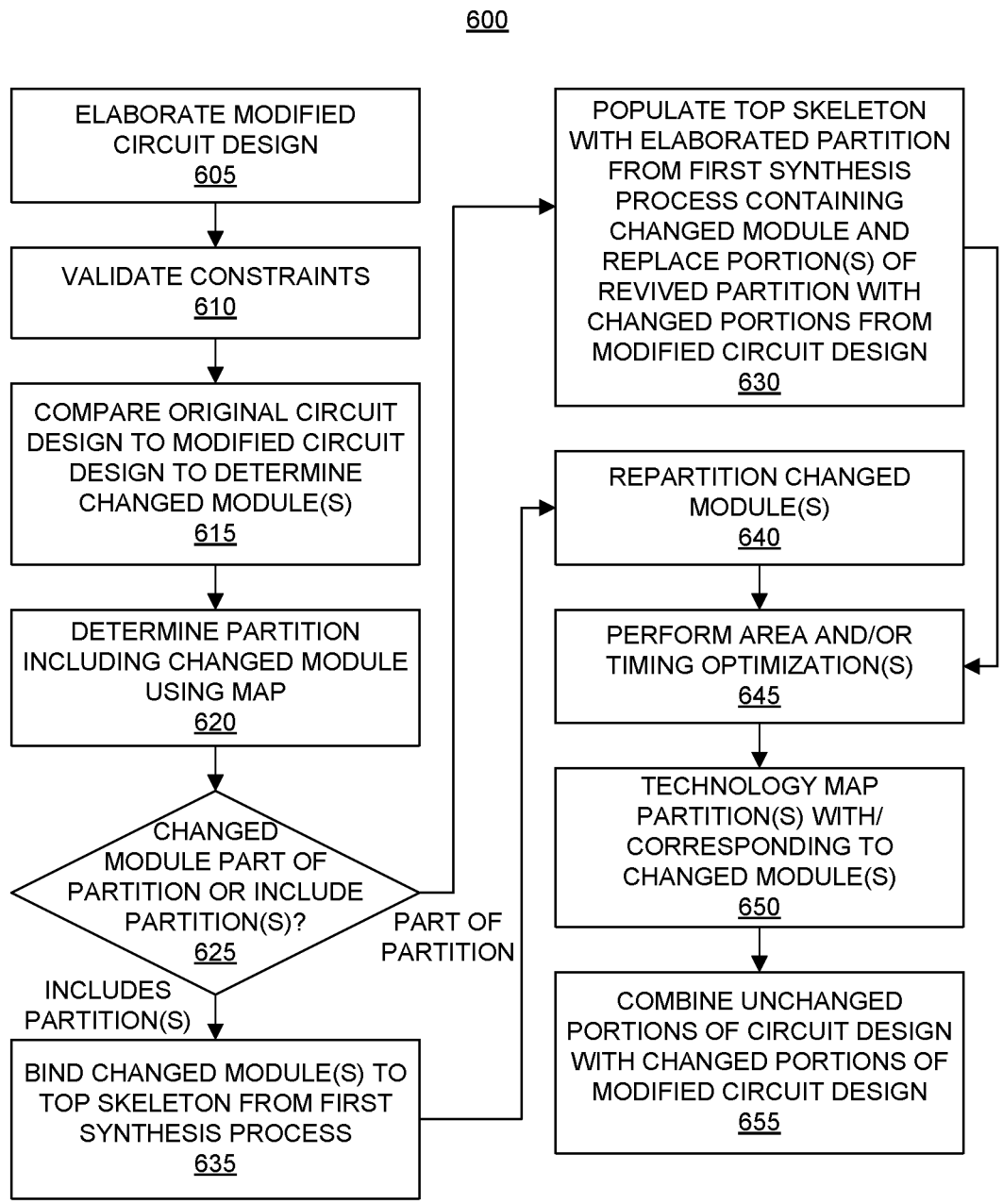
FIG. 6 illustrates an example method of synthesizing a modified version of a circuit design.

FIG. 6 illustrates an example method 600 of synthesizing the modified circuit design. Method 600 may be performed by a system such as the system described in connection with FIG. 1. Method 600 illustrates an example of the second synthesis process as described in connection with FIG. 2 to process circuit design 235. As discussed, method 600 may be referred to as an incremental synthesis process as portions of the first synthesis process are re-used and less than the entire circuit design is synthesized anew.

Method 600 may begin in a state where the circuit design processed through the method of FIG. 4 is modified. For example, a module within a partition of the circuit design may be changed. In another example, a module that includes multiple partitions may be changed. Method 600 operates on the modified circuit design. The system may perform method 600 in response to a received command to perform incremental synthesis. The command to perform incremental synthesis may also specify or include a reference to the design checkpoint files generated during the first synthesis process.

In block 605, the system is capable of elaborating the modified circuit design. In block 610, the system is capable of validating constraints of the elaborated version of the modified circuit design.

In block 615, the system is capable of comparing the original circuit design to the modified circuit design to determine the module(s) that have changed, e.g., to determine the module(s) of the modified circuit design that differ from modules of the original circuit design. For example, the system is capable of extracting the elaborated version of the original circuit design from the first design checkpoint file. The system is capable of comparing the elaborated version of the original circuit design with the elaborated version of the modified circuit design to determine changes, e.g., a module that has changed, from the original circuit design to the modified circuit design.

For example, the system is capable of starting at the top module of the original circuit design and the top module of the modified circuit design. The system is capable of traversing the original and modified circuit design hierarchies by comparing each module of the original circuit design with each corresponding module of the modified circuit design. The system, for example, may compare attributes, names, and logic recursively from top to bottom of each hierarchy to identify the changed module(s). The elaborated version of a circuit design may also be referred to as a data flow graph or "DFG". In this regard, the system is capable of comparing the DFG of the original circuit design to the DFG of the modified circuit design to identify any changes implemented in the modified circuit design (e.g., a changed module or modules).

In block 620, the system is capable of determining the partition that includes the changed module using the map. For example, the system is capable of detecting the module that has changed from the original circuit design to the modified circuit design by the comparison performed in block 615. The system may then use the map to determine the particular partition that includes the changed module. As discussed, the map is determined during the first synthesis process where partitioning is performed. The modified circuit design is not partitioned.

For example, referring to the example of FIGS. 3A and 3B, the system is capable of determining that module 360-1 changed from circuit design 215 to circuit design 235 (e.g., to module 360-2). Using the map and the same partitioning used during the first synthesis process, the system is able to determine that changed module 360-2 is contained within partition 355.

In block 625, the system is capable of determining whether the changed module is part of a partition or includes one or more partitions. In response to determining that the changed module is part of a partition, method 600 continues to block 630. In response to determining that the changed module includes one or more partitions, method 600 continues to block 635.

In block 630, where the changed module is part of a partition, the system populates the top skeleton with the elaborated partition from the first synthesis process that includes the changed module and replaces portion(s) of the revived partition with changed portions from the modified circuit design. The system is capable of extracting the partition including the changed module from the elaborated circuit design stored in the first design checkpoint file. The system is capable of extracting top skeleton 220 from the third design checkpoint file. The partition from the first synthesis process includes the original version of the module that changed. The system is capable of inserting the elaborated partition into partition $355_{BB}$ in top skeleton 220. It should be appreciated that the partitioning determined during the first synthesis process is specified via the partitioned and elaborated version of the circuit design stored in the first design checkpoint file. Further, the map and top skeleton specify module/partition hierarchy, at least in part. Accordingly, the system is capable of identifying partition(s) from the elaborated version of the circuit design generated during the first synthesis process that correspond to partition $355_{BB}$.

For purposes of discussion, any partition from the first synthesis process that is populated into the top skeleton and, therefore, used during the second synthesis process, may be referred to as a "revived" partition. In using the revived partition, e.g., the elaborated partition from the first circuit design, the original partitioning performed during the first synthesis process is used, at least in part, during the second synthesis process.

Further, as part of block 630, once the elaborated partition is revived, the system is capable of replacing the portions of the revived partition with the corresponding portions from the modified circuit design that have changed. The system is capable of removing, from the revived partition, the original version of the module that changed and replacing the original version of the module with the changed module from the modified and elaborated circuit design. For example, the system is capable of replacing the elaborated version of module 360-1 from partition 355 in top skeleton 220 with the elaborated version of module 360-2. After block 630, method 600 may continue to block 645. As such, the system is capable of re-using an elaborated partition of the original circuit design that includes an original version of the changed module, replacing the original version of the changed module within the elaborated partition with the changed version from the modified circuit design, and technology mapping the elaborated partition.

In block 635, where the changed module includes one or more partitions, the system is capable of binding the changed module directly to the top skeleton. For example, the system may include the elaborated version of the changed module, including the contents of the changed module, generated during block 605 within the top skeleton. For example, if module 325 was determined to be the changed module, the elaborated version of module 325 from the modified circuit design may be bound to the top skeleton. After block 635, method 600 may continue to block 640.

In block 640, the system may optionally repartition the changed module. In this regard, the partitioning for other portions of the modified circuit design is retained (e.g., re-used) from the first synthesis process thereby substantially preserving any QOR obtained during the first synthesis process. Repartitioning, if performed, may be limited to the changed module or modules during the second synthesis process. If, for example, the changed module is too large (e.g., larger than a threshold size), the system is capable of creating additional partitions. These partitions can be synthesized in parallel using a parallel synthesis framework. As an illustrative and non-limiting example, where module 325 is the changed module, the system may repartition module 325. In that case, the system may create a different and/or new partitioning of module 325. Partitions 350 and 355 may remain intact or unchanged.

In block 645, the system may optionally perform one or more optimizations. For example, the system may perform one or more area optimizations and/or one or more timing optimizations.

In one or more embodiments, as part of performing optimizations, the system is capable of reviving partitions of the constraint circuit design stored in the second design checkpoint file from the first synthesis process within the top skeleton. For example, the system may extract partitions 340, 345, 350, and 355 from the second design checkpoint file to obtain the timing constraints from the boundaries of such partitions. The system may then apply or correlate the timing constraints to the boundaries of the respective partitions in the top skeleton (e.g., to elements of the circuit design such as signals and/or pins on the boundary and/or defining the boundary of such partitions).

With the timing constraints applied to the partition boundaries of the top skeleton, the system may optionally perform one or more timing optimizations on the elaborated version of the changed module. Recall that the elaborated version of the module has been updated to include the change from the modified circuit design. The system is capable of performing timing and/or area optimizations on the module of the top skeleton including the change (e.g., the module of the modified circuit design).

In block 650, the system is capable of technology mapping the partitions with changed portions of the modified circuit design. In one or more embodiments, the system technology maps only the partitions with changed portions of the modified circuit design. For example, if module 360-2 is the changed module, the system technology maps only partition 355 with module 360-2 contained therein. Thus, the top skeleton includes a technology mapped version of partition 355, which corresponds to the modified circuit design. In another example, if the changed module is module 325, the system is capable of technology mapping partitions 340 and 345 and/or any other partitions that may be generated during repartitioning of module 325 if performed.

In block 655, the system is capable of combining unchanged portions of the circuit design with the changed portions of the modified circuit design to generate a second synthesized circuit design. For example, in the case where module 360-2 has changed, the system is capable of combining synthesized partitions from the first synthesized circuit design that are unchanged relative to the second circuit design (e.g., partitions 340s, 345s, and 350s) with the synthesized partition of the modified circuit design (e.g., 355s which now includes synthesized module 360-2). The system is capable of inserting the synthesized partitions of the first synthesis run that do not include a changed module into the top skeleton. Once the top skeleton again includes the revived partitions (where the revived partitions are not black-boxed), the system is capable of reconnecting the revived partitions with the partition that includes the changed module into a complete synthesized circuit design.

In another example where module 325 is the changed module, the synthesized (e.g., technology mapped) partitions generated during block 650 may be combined with the other unchanged partitions (e.g., partitions 350 and 355) that may be revived from the first synthesis process. The system may reconnect the revived partitions with the partitions of module 325 to form a complete synthesized circuit design.

In one or more embodiments, the system optionally performs a global optimization on the post-technology mapped circuit design where cross partition boundary optimizations are permitted. In particular embodiments, the global optimization may be light-weight or limited in scope.

Use of the techniques described herein in synthesizing circuit designs results in re-use of cells and/or nets from the first synthesis process within the second synthesis process. Using the techniques described herein results in cell-reuse that is approximately 12% greater than other techniques in some cases. Net re-use is approximately 46% greater than with other conventional techniques in some cases. This re-use reduces the runtime of the system for performing synthesis on a modified circuit design. The techniques described herein reduce system runtime by approximately 30% in some cases where the system run took approximately 15-20 minutes. In larger circuit designs, re-use of cells and/or nets may be as large as 90%. This type of improvement in asset re-use within larger circuit designs has led to reduced system runtime where system speed has increased by a factor of 2 or 3 in some cases. Moreover, the re-use of cells and nets as described contributes to improved operation of the placer and router, which may further reduce runtime of the system and contribute to predictability and/or improved QOR.

In many cases, small changes in RTL of a circuit design causes a system to generate different names during synthesis even for unchanged portions of the circuit design. Since the placers and routers (e.g., incremental placers and routers) typically rely on name matching to re-use cells and/or nets, even minor changes to the name of a cell and/or net may degrade the ability of the placer and/or router to re-use such assets. By improving the ability to re-use assets during incremental synthesis, the system facilitates improved re-use of cells and/or nets by the placer and router during later phases of the design flow thereby improving runtime of the system and improving QOR predictability.

Figure 7:
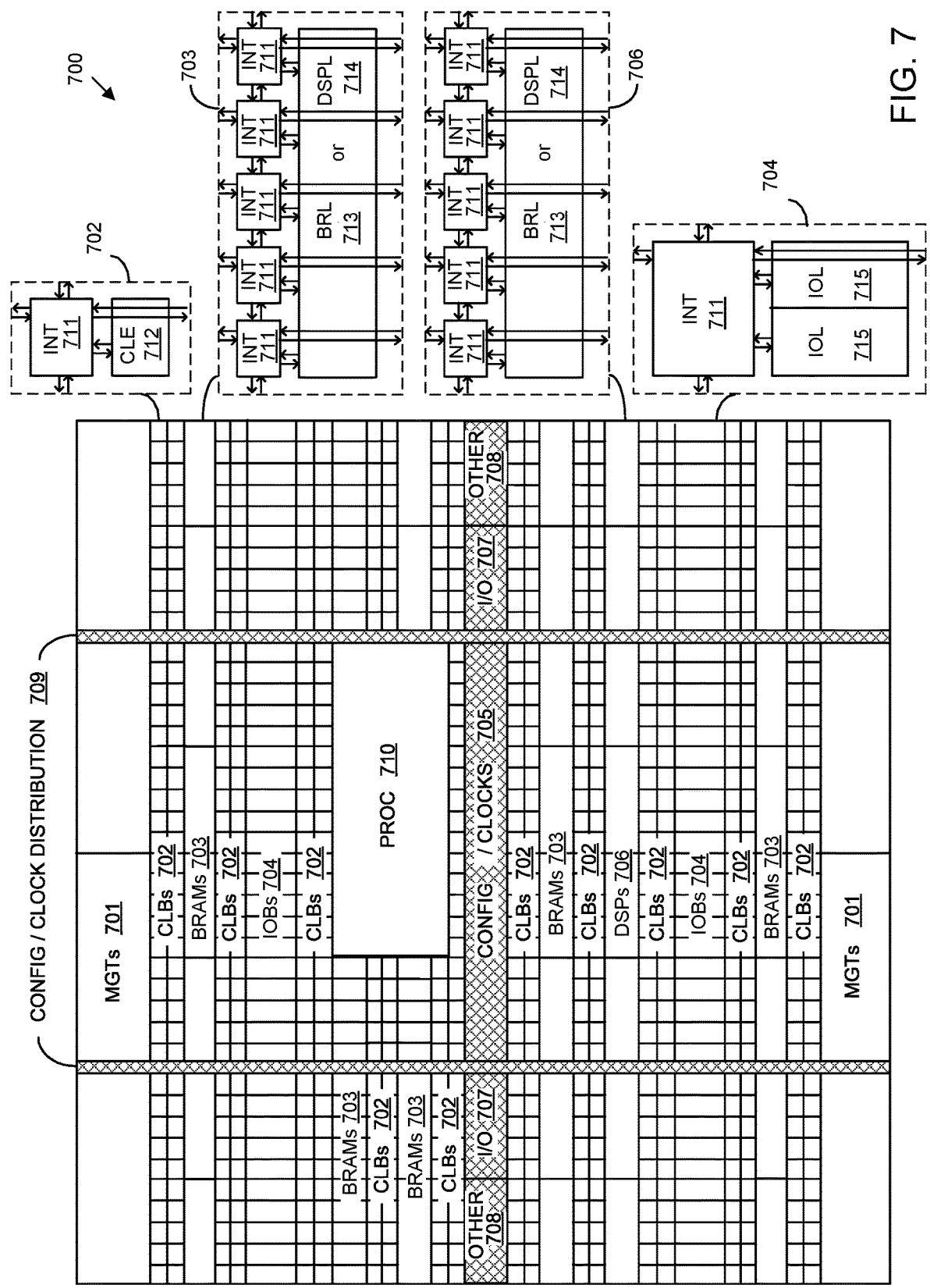
FIG. 7 illustrates an example architecture for an integrated circuit.

FIG. 7 illustrates an example architecture 700 for an IC. In one aspect, architecture 700 may be implemented within a programmable IC. For example, architecture 700 may be used to implement a field programmable gate array (FPGA). Architecture 700 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An IOB 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

A circuit design processed through a design flow as discussed within this disclosure may be implemented within an IC having an architecture the same as or similar to architecture 700. For example, the original circuit design and/or the modified circuit design may be placed, routed, and optionally optimized. A configuration bitstream may be generated from the circuit design and loaded into the IC thereby physically implementing the circuit design within the IC. In one or more other embodiments, the original and/or modified circuit design may be implemented within an application-specific IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method can include synthesizing, using computer hardware, a first circuit design resulting in a partitioning of the first circuit design and a plurality of synthesized partitions of the first circuit design, for a second circuit design that is a modified version of the first circuit design and based upon the partitioning of the first circuit design, determining, using the computer hardware, a partition of the second circuit design that differs from the first circuit design, and technology mapping, using the computer hardware, the partition of the second circuit design resulting in a synthesized partition of the second circuit design. The method can include generating, using the computer hardware, a synthesized circuit design corresponding to the second circuit design by combining synthesized partitions of the plurality of synthesized partitions of the first circuit design that are unchanged relative to the second circuit design with the synthesized partition of the second circuit design.

In an aspect, the method can include generating a top skeleton including empty partitions of the first circuit design based upon the partitioning of the first circuit design. The generating the synthesized circuit design corresponding to the second circuit design may be performed by populating the synthesized partitions of the plurality of synthesized partitions of the first circuit design that are unchanged relative to the second circuit design and the synthesized partition of the second circuit design within the top skeleton.

In another aspect, the partition of the second circuit design that differs from the first circuit design includes a changed module.

In another aspect, the method may include generating a map of modules of the first circuit design according to the partitioning and determining the partition of the second circuit design that differs from the first circuit design based upon the map.

In another aspect, the method may include repartitioning the changed module.

In another aspect, only the partition with the changed module of the second circuit design that differs from the first circuit design is technology mapped.

In another aspect, the method may include performing a timing optimization across partitions of the synthesized circuit design.

In another aspect, the technology mapping the partition of the second circuit design may include re-using an elaborated partition of the first circuit design that includes an original version of a selected module, replacing the original version of the selected module within the elaborated partition with a changed version of the selected module, and technology mapping the elaborated partition.

In another aspect, the technology mapping the partition of the second circuit design may include binding a selected module of the second circuit design that has changed relative to the first circuit design and that includes a plurality of partitions to a top skeleton of the first circuit design and technology mapping the selected module.

In one or more embodiments, a system includes a memory configured to store program code and a processor coupled to the memory. The processor, in response to executing the program code, is configured to initiate operations. The operations can include synthesizing a first circuit design resulting in a partitioning of the first circuit design and a plurality of synthesized partitions of the first circuit design, for a second circuit design that is a modified version of the first circuit design and based upon the partitioning of the first circuit design, determining a partition of the second circuit design that differs from the first circuit design, and technology mapping the partition of the second circuit design resulting in a synthesized partition of the second circuit design. The operations can include generating a synthesized circuit design corresponding to the second circuit design by combining synthesized partitions of the plurality of synthesized partitions of the first circuit design that are unchanged relative to the second circuit design with the synthesized partition of the second circuit design.

In an aspect, the processor is configured to initiate operations that may include generating a top skeleton including empty partitions of the first circuit design based upon the partitioning of the first circuit design. The generating the synthesized circuit design corresponding to the second circuit design may be performed by populating the synthesized partitions of the plurality of synthesized partitions of the first circuit design that are unchanged relative to the second circuit design and the synthesized partition of the second circuit design within the top skeleton.

In another aspect, the partition of the second circuit design that differs from the first circuit design includes a changed module.

In another aspect, the processor is configured to initiate operations that may include generating a map of modules of the first circuit design according to the partitioning and determining the partition of the second circuit design that differs from the first circuit design based upon the map.

In another aspect, the processor is configured to initiate operations that may include repartitioning the changed module.

In another aspect, only the partition with the changed module of the second circuit design that differs from the first circuit design is technology mapped.

In another aspect, the processor is configured to initiate operations that may include performing a timing optimization across partitions of the synthesized circuit design.

In another aspect, the technology mapping the partition of the second circuit design may include re-using an elaborated partition of the first circuit design that includes an original version of a selected module, replacing the original version of the selected module within the elaborated partition with a changed version of the selected module, and technology mapping the elaborated partition.

In another aspect, the technology mapping the partition of the second circuit design may include binding a selected module of the second circuit design that has changed relative to the first circuit design and that includes a plurality of partitions to a top skeleton of the first circuit design and technology mapping the selected module.

In one or more embodiments, a computer program product includes a computer readable storage medium having program code stored thereon. The program code is executable by a processor to perform operations. The operations can include synthesizing a first circuit design resulting in a partitioning of the first circuit design and a plurality of synthesized partitions of the first circuit design, for a second circuit design that is a modified version of the first circuit design and based upon the partitioning of the first circuit design, determining a partition of the second circuit design that differs from the first circuit design, and technology mapping the partition of the second circuit design resulting in a synthesized partition of the second circuit design. The operations can include generating a synthesized circuit design corresponding to the second circuit design by combining synthesized partitions of the plurality of synthesized partitions of the first circuit design that are unchanged relative to the second circuit design with the synthesized partition of the second circuit design.

In an aspect, the operations can include generating a top skeleton including empty partitions of the first circuit design based upon the partitioning of the first circuit design. The generating the synthesized circuit design corresponding to the second circuit design may be performed by populating the synthesized partitions of the plurality of synthesized partitions of the first circuit design that are unchanged relative to the second circuit design and the synthesized partition of the second circuit design within the top skeleton.

In another aspect, the partition of the second circuit design that differs from the first circuit design includes a changed module.

In another aspect, the operations may include generating a map of modules of the first circuit design according to the partitioning and determining the partition of the second circuit design that differs from the first circuit design based upon the map.

In another aspect, the operations may include repartitioning the changed module.

In another aspect, only the partition with the changed module of the second circuit design that differs from the first circuit design is technology mapped.

In another aspect, the operations may include performing a timing optimization across partitions of the synthesized circuit design.

In another aspect, the technology mapping the partition of the second circuit design may include re-using an elaborated partition of the first circuit design that includes an original version of a selected module, replacing the original version of the selected module within the elaborated partition with a changed version of the selected module, and technology mapping the elaborated partition.

In another aspect, the technology mapping the partition of the second circuit design may include binding a selected module of the second circuit design that has changed relative to the first circuit design and that includes a plurality of partitions to a top skeleton of the first circuit design and technology mapping the selected module.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    synthesizing, using computer hardware, a first circuit design resulting in a partitioning of the first circuit design and a plurality of synthesized partitions of the first circuit design;
    for a second circuit design that is a modified version of the first circuit design and partitioned using the partitioning of the first circuit design, determining, using the computer hardware, a partition of the second circuit design that differs from the first circuit design, wherein the partition of the second circuit design that differs from the first circuit design includes a changed module;
    technology mapping, using the computer hardware, the partition of the second circuit design resulting in a synthesized partition of the second circuit design; and
    generating, using the computer hardware, a synthesized circuit design corresponding to the second circuit design by combining synthesized partitions of the plurality of synthesized partitions of the first circuit design that are unchanged relative to the second circuit design with the synthesized partition of the second circuit design.

2. The method of claim 1, further comprising:
    generating a top skeleton including empty partitions of the first circuit design based upon the partitioning of the first circuit design; and
    wherein the generating the synthesized circuit design corresponding to the second circuit design is performed by populating the synthesized partitions of the plurality of synthesized partitions of the first circuit design that are unchanged relative to the second circuit design and the synthesized partition of the second circuit design within the top skeleton.

3. The method of claim 1, wherein the changed module includes a register transfer level description that differs from a register transfer level description of the same partition of the first circuit design.

4. The method of claim 1, further comprising:
    generating a map of modules of the first circuit design according to the partitioning; and
    determining the partition of the second circuit design that differs from the first circuit design based upon the map.

5. The method of claim 1, further comprising:
    repartitioning the changed module.

6. The method of claim 1, wherein only the partition with the changed module of the second circuit design that differs from the first circuit design is technology mapped.

7. The method of claim 1, further comprising:
    performing a timing optimization across partitions of the synthesized circuit design.

8. The method of claim 1, wherein the technology mapping the partition of the second circuit design comprises:
    re-using an elaborated partition of the first circuit design that includes an original version of a selected module;
    replacing the original version of the selected module within the elaborated partition with a changed version of the selected module; and
    technology mapping the elaborated partition.

9. The method of claim 1, wherein the technology mapping the partition of the second circuit design comprises:
    binding a selected module of the second circuit design that has changed relative to the first circuit design and that includes a plurality of partitions to a top skeleton of the first circuit design; and
    technology mapping the selected module.

10. A system, comprising:
    a processor configured to initiate operations including:
    synthesizing a first circuit design resulting in a partitioning of the first circuit design and a plurality of synthesized partitions of the first circuit design;
    for a second circuit design that is a modified version of the first circuit design and partitioned using the partitioning of the first circuit design, determining a partition of the second circuit design that differs from the first circuit design, wherein the partition of the second circuit design that differs from the first circuit design includes a changed module;
    technology mapping the partition of the second circuit design resulting in a synthesized partition of the second circuit design; and
    generating a synthesized circuit design corresponding to the second circuit design by combining synthesized partitions of the plurality of synthesized partitions of the first circuit design that are unchanged relative to the second circuit design with the synthesized partition of the second circuit design.

11. The system of claim 10, wherein the processor is configured to initiate operations further comprising:
generating a top skeleton including empty partitions of the first circuit design based upon the partitioning of the first circuit design; and
wherein the generating the synthesized circuit design corresponding to the second circuit design is performed by populating the synthesized partitions of the plurality of synthesized partitions of the first circuit design that are unchanged relative to the second circuit design and the synthesized partition of the second circuit design within the top skeleton.

12. The system of claim 10, wherein the changed module includes a register transfer level description that differs from a register transfer level description of the same partition of the first circuit design.

13. The system of claim 10, wherein the processor is configured to initiate operations further comprising:
generating a map of modules of the first circuit design according to the partitioning; and
determining the partition of the second circuit design that differs from the first circuit design based upon the map.

14. The system of claim 10, wherein the processor is configured to initiate operations further comprising:
repartitioning the changed module.

15. The system of claim 10, wherein only the partition with the changed module of the second circuit design that differs from the first circuit design is technology mapped.

16. The system of claim 10, wherein the processor is configured to initiate operations further comprising:
performing a timing optimization across partitions of the synthesized circuit design.

17. The system of claim 10, wherein the technology mapping the partition of the second circuit design comprises:
re-using an elaborated partition of the first circuit design that includes an original version of a selected module;
replacing the original version of the selected module within the elaborated partition with a changed version of the selected module; and
technology mapping the elaborated partition.

18. The system of claim 10, wherein the technology mapping the partition of the second circuit design comprises:
binding a selected module of the second circuit design that has changed relative to the first circuit design and that includes a plurality of partitions to a top skeleton of the first circuit design; and
technology mapping the selected module.

19. A computer program product, comprising:
a computer readable storage medium having program code stored thereon, the program code executable by computer hardware to initiate operations including:
synthesizing a first circuit design resulting in a partitioning of the first circuit design and a plurality of synthesized partitions of the first circuit design;
for a second circuit design that is a modified version of the first circuit design and partitioned using the partitioning of the first circuit design, determining a partition of the second circuit design that differs from the first circuit design, wherein the partition of the second circuit design that differs from the first circuit design includes a changed module;
technology mapping the partition of the second circuit design resulting in a synthesized partition of the second circuit design; and
generating a synthesized circuit design corresponding to the second circuit design by combining synthesized partitions of the plurality of synthesized partitions of the first circuit design that are unchanged relative to the second circuit design with the synthesized partition of the second circuit design.

20. The computer program product of claim 19, wherein the technology mapping the partition of the second circuit design comprises:
re-using an elaborated partition of the first circuit design that includes an original version of a selected module;
replacing the original version of the selected module within the elaborated partition with a changed version of the selected module; and
technology mapping the elaborated partition.

* * * * *